Figure 1:
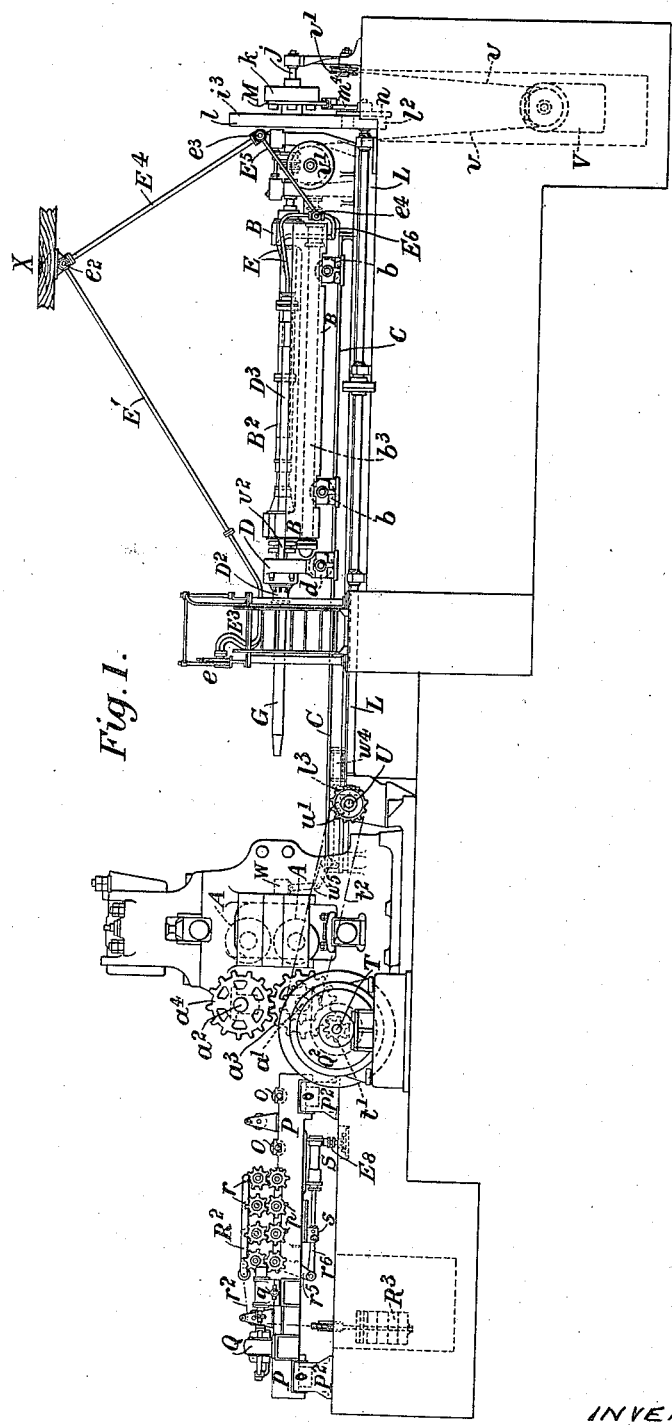

J. G. & G. R. INSHAW.
APPARATUS FOR USE IN MAKING WELDLESS TUBES FROM HOLLOW BLOOMS, BILLETS, AND THE LIKE.
APPLICATION FILED JUNE 13, 1917.

1,263,251.

Patented Apr. 16, 1918.

7 SHEETS—SHEET 1.

INVENTORS
JOHN GEORGE INSHAW
GEORGE RICHARD INSHAW
BY Howson and Howson ATTORNEYS

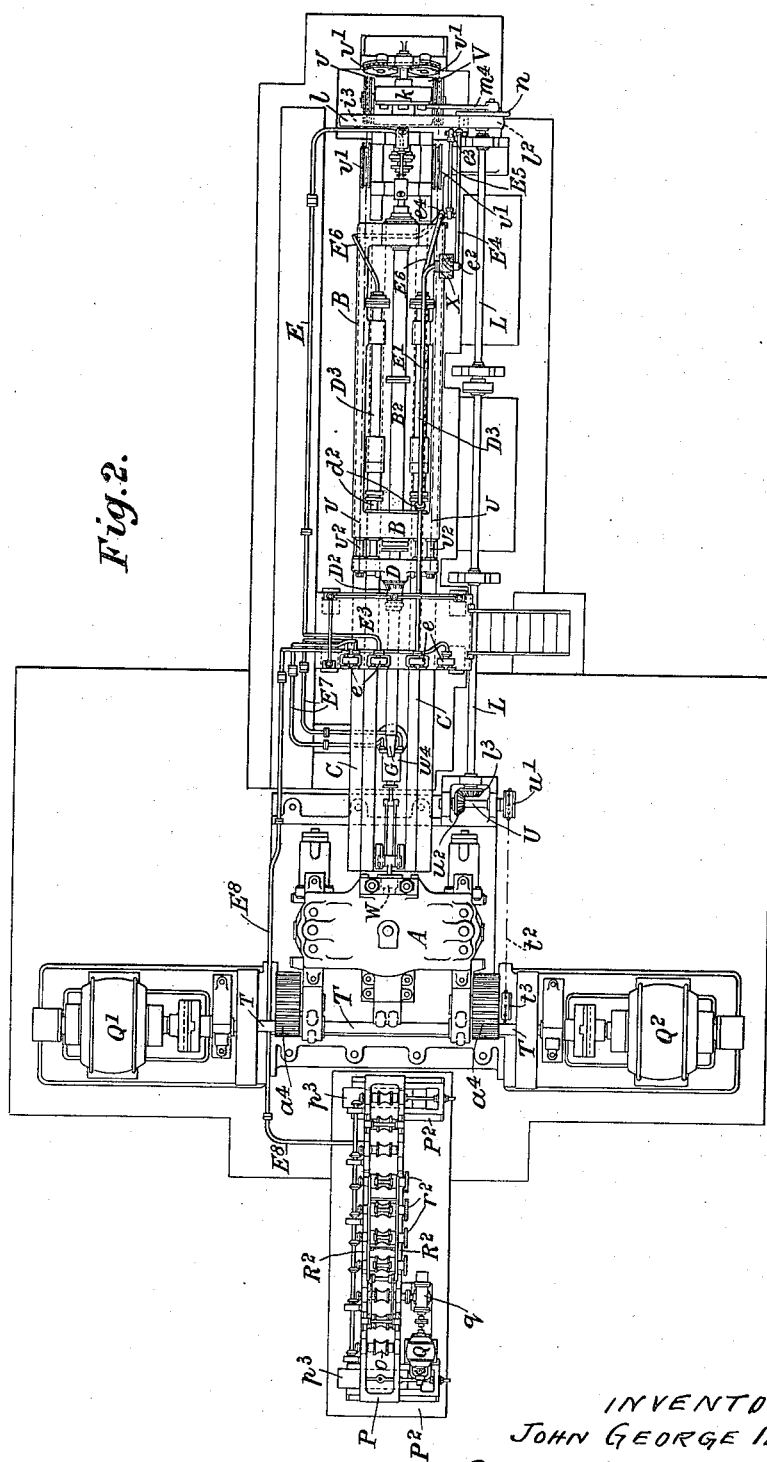

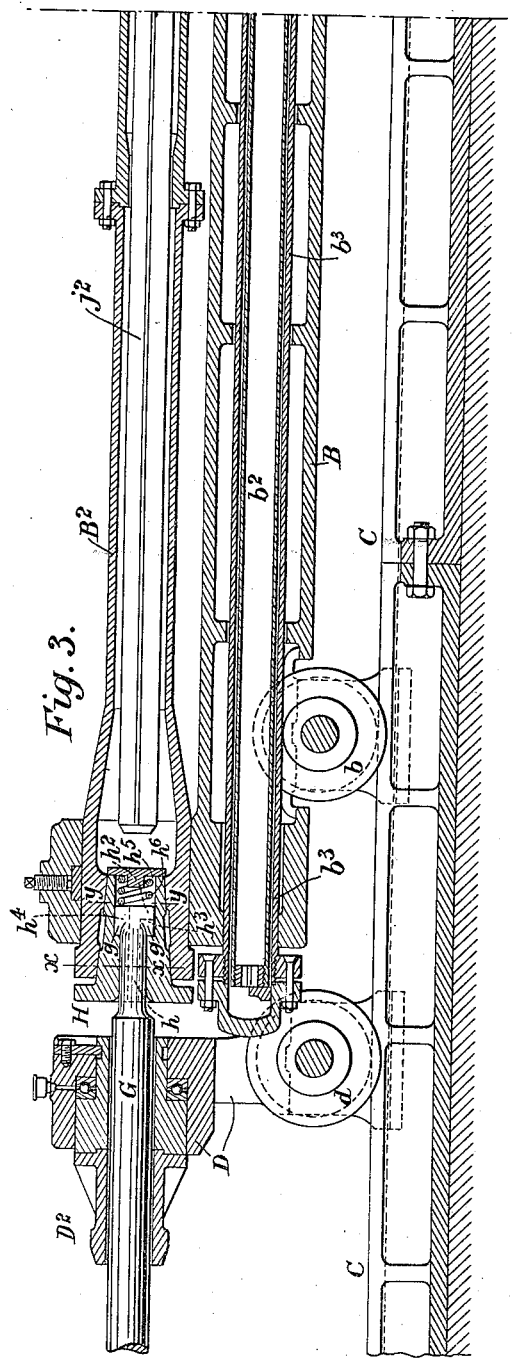

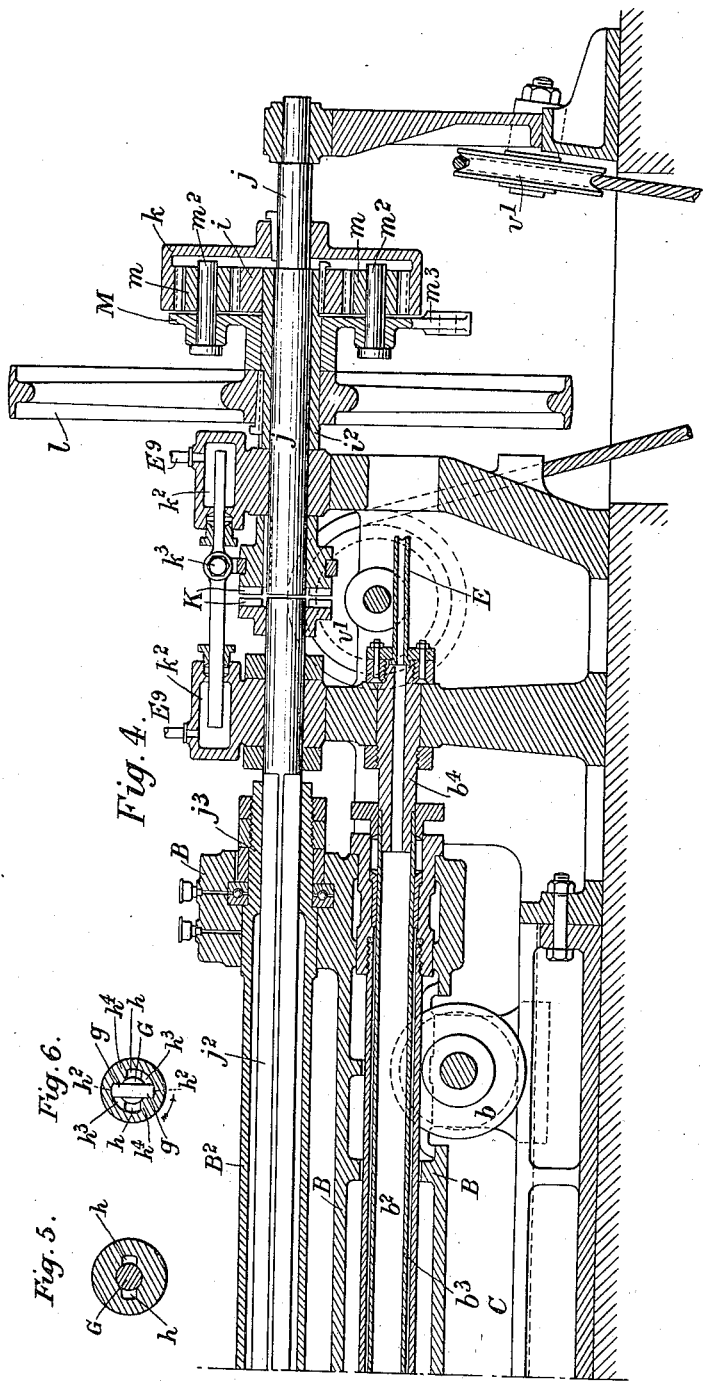

J. G. & G. R. INSHAW.
APPARATUS FOR USE IN MAKING WELDLESS TUBES FROM HOLLOW BLOOMS, BILLETS, AND THE LIKE.
APPLICATION FILED JUNE 13, 1917.
1,263,251.
Patented Apr. 16, 1918.
7 SHEETS—SHEET 5.
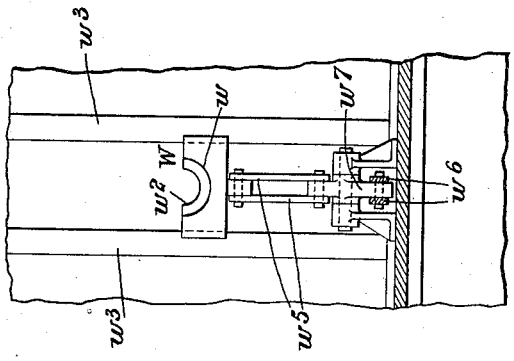
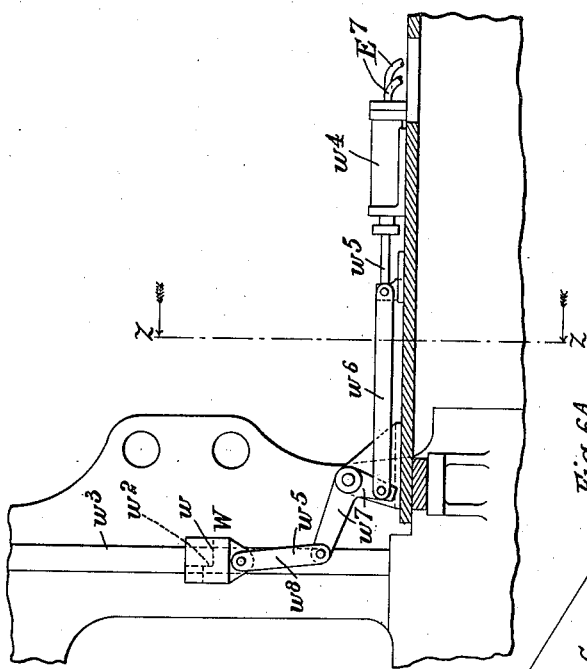
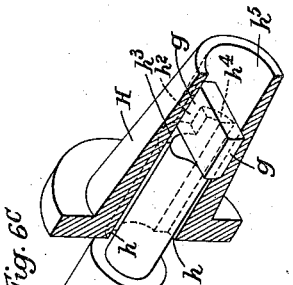
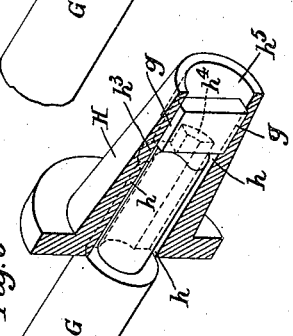
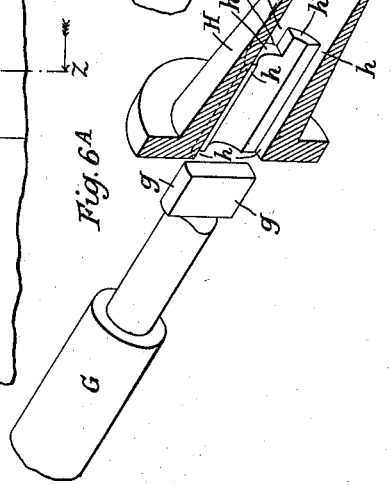
INVENTORS
JOHN GEORGE INSHAW
GEORGE RICHARD INSHAW
BY Hinson and Hinson
ATTORNEYS J. G. & G. R. INSHAW.
APPARATUS FOR USE IN MAKING WELDLESS TUBES FROM HOLLOW BLOOMS, BILLETS, AND THE LIKE.
APPLICATION FILED JUNE 13, 1917.
1,263,251.
Patented Apr. 16, 1918.
7 SHEETS—SHEET 6.
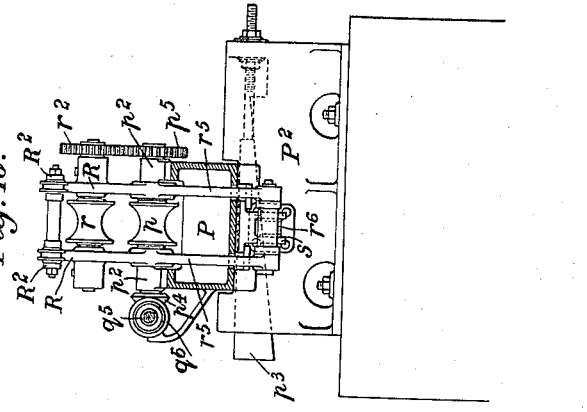
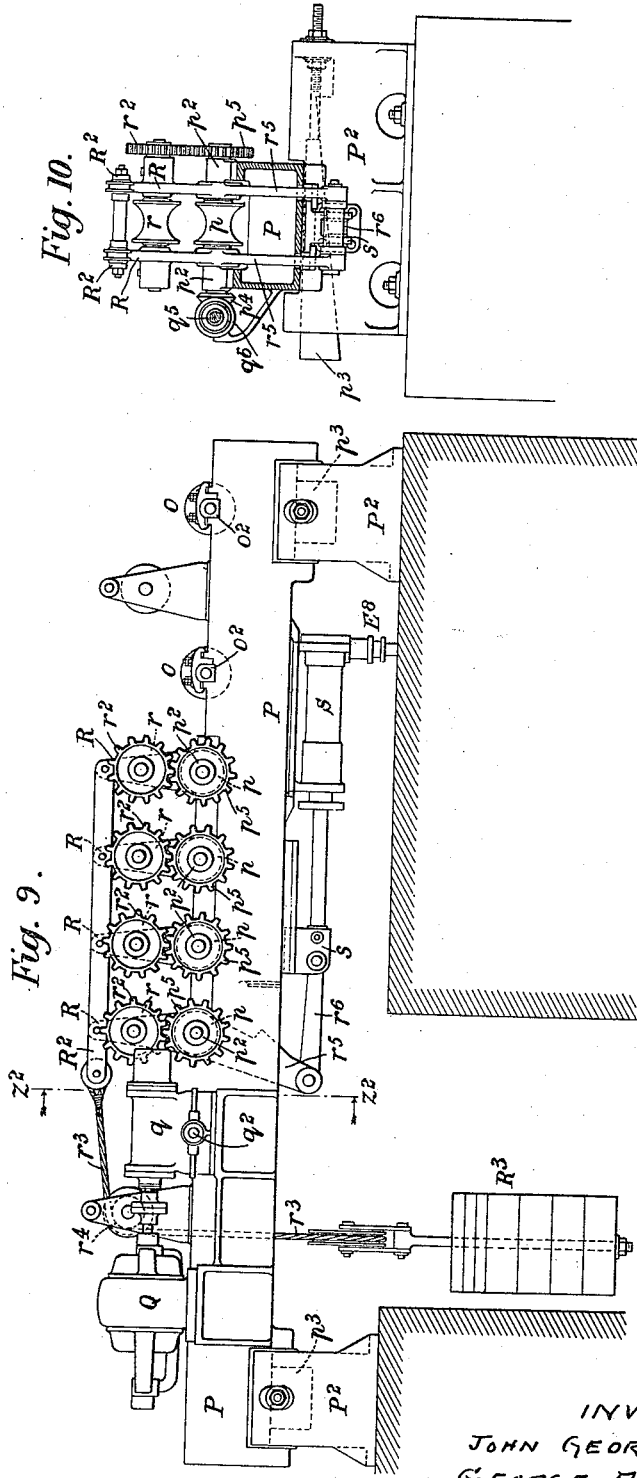
INVENTORS
JOHN GEORGE INSHAW
GEORGE RICHARD INSHAW
BY
ATTORNEYS

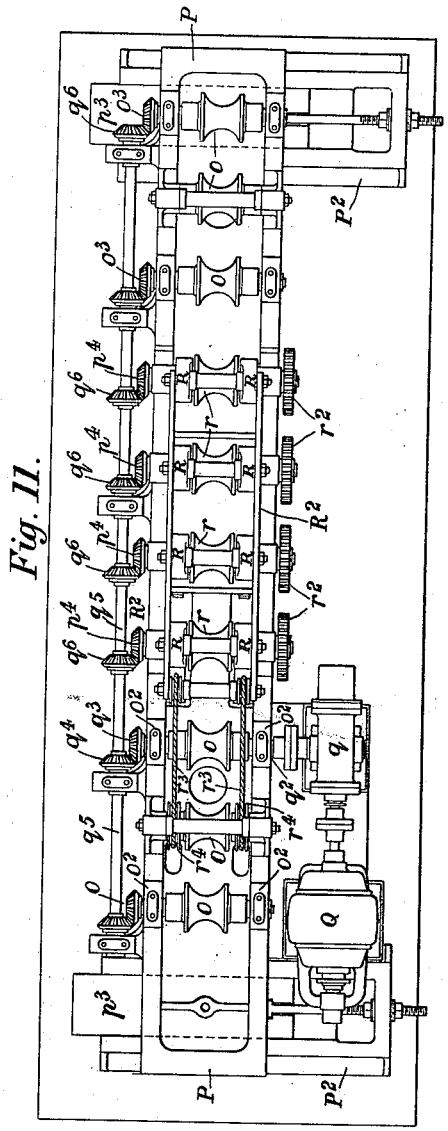

UNITED STATES PATENT OFFICE.

JOHN GEORGE INSHAW AND GEORGE RICHARD INSHAW, OF NEAR GARTCOSH, NORTH BRITAIN.

APPARATUS FOR USE IN MAKING WELDLESS TUBES FROM HOLLOW BLOOMS, BILLETS, AND THE LIKE.

1,263,251.              Specification of Letters Patent.      Patented Apr. 16, 1918.

Original application filed November 14, 1916, Serial No. 131,353. Divided and this application filed June 13, 1917. Serial No. 174,591.

*To all whom it may concern:*

Be it known that we, JOHN GEORGE INSHAW and GEORGE RICHARD INSHAW, both subjects of the King of Great Britain, and both residing at Lochwood House, near Gartcosh, in the county of Lanark, North Britain, have invented new and useful Improvements in Apparatus for Use in Making Weldless Tubes from Hollow Blooms, Billets, and the like, of which the following is a specification.

Our present invention relates to apparatus for making weldless tubes from hollow blooms, or billets, and the like (which we will, for brevity, refer to as the bloom), the object of our said invention being to provide improved apparatus which is under ready and economical control and capable of being operated with great facility and which will do the work with better effect and more rapidly and economically than is the case with apparatus as hitherto constructed, or arranged for this purpose, it being possible, by means of apparatus in accordance with this invention, to operate on thinner blooms without reheating them.

The principal feature of improvement according to our present invention, (over and beyond the general arrangement of the apparatus as a whole), is the arrangement of the feeding devices so that hydraulic swaging, or pilgering, (that is the required action upon the blooms to form the tubes), can be effected without leaving, on the work, the large end which has hitherto been left and has had to be cut off and remelted.

The general combination is as follows:—

For connecting and disconnecting the mandrels from the apparatus we provide the mandrels with a flattened end-piece, (or wing-pieces), and the mandrel holder with crossing slots, one slot extending through the holder and the other slot not extending through the holder, so that the mandrels can be connected to, and disconnected from, the holder by longitudinal movements and movements of partial rotation. In order, that this connection and disconnection may be effected with but small longitudinal movement, the said crossing slots may be provided with short and long projections as hereinafter described.

For enabling the rolls to operate upon the bloom throughout the whole length of the work and leave no large end of metal on the tube, we provide an arrangement of pusher, or feeding devices, consisting mainly of two carriages and means for rendering them capable of movement independently of each other, as hereinafter explained, so that the rolls can operate completely right through to the rear of the work, and leave no thick end thereon.

For giving the required intermittent movements of partial rotation during the work we prefer to employ the mechanism which is the subject matter of our application for Patent Serial No. 131,353, which application originally included the subject matter of the present application. For stripping the completed tubes from the mandrel and removing them from the machine we may use any suitable means but we prefer to use rollers upon which the work is received and other rollers with means for causing them to grip the work between themselves and the first named rollers, or some of them, means being provided for rotating the said rollers and for gripping and releasing the tubes as required.

The rolls which we use in combination with the foregoing may be of any suitable kind which will operate upon the blooms to form the tubes, but we prefer to use for this purpose pilgering rolls operated as described in the specification of Letters Patent No. 995,427 of 13th June, 1911, granted to us.

We will describe, with reference to the accompanying drawings, constructions, and an arrangement, or combination, of parts, in accordance with this invention, it being understood that we do not limit ourselves to the precise details illustrated in, and described with reference to, these drawings.

Figure 1 is a side elevation, and Fig. 2 a plan, of the general arrangement of apparatus in accordance with our present invention, these figures being drawn to a smaller scale than those to which the other figures are drawn. Figs. 3 and 4 are longitudinal sections respectively of the forward and rearward parts of the hydraulic feeding gear, Fig. 3 showing the improved means for attaching the mandrels to, and removing them from, the mandrel holder. Figs. 5 and 6 are transverse sections respectively taken on the lines $xx$ and $yy$ Fig. 3. Figs. $6^A$, $6^B$ and $6^C$ show to a larger scale, the end of a mandrel and a section of the holder to illustrate the way in which the mandrels are secured in, and removed from, the holder. Fig. 7 is an elevation, and Fig. 8 is a section, on the line $z, z$, Fig. 7, of the combined support and stop for the forward end of the bloom while the mandrel is being passed through the opening in the bloom. Fig. 9 is a side elevation, Fig. 10 is a section on the line $z^2, z^2$, Fig. 9, and Fig. 11 is a plan, of the stripping gear by which the work is removed from the mandrel.

The rolls (shown as situated at A) are presumed to be such as will operate upon, or pilger, the blooms, as described in our aforesaid specification of Letters Patent No. 995,427 of 13 June 1911. B is the rear carriage, the wheels $b$, of which run on rails C, the said carriage B, carrying the hydraulic cylinders and rams by which the carriages are moved forward, the said carriage B having, connected with it, a holder for the mandrels G, (which carry the work) and the necessary mandrel-carrying, and actuating, parts. The forward carriage D, is mounted on wheels $d$, which run on the rails C and the said carriage D, has a nose-piece $D^2$ through which the mandrel G, passes. The pipes for conveying water under pressure to the hydraulic cylinders and rams by which the various parts are operated, and the devices for controlling the distribution, through the said pipes, of the water under pressure, are arranged in any suitable way and so that, where it is necessary to do so, they allow of the movements of the movable parts of the apparatus. The controlling devices at $e$, for supplying the pressure water as required, are in convenient position for being operated by a man on the bridge $E^3$, from which he can, if so desired, view the operation of the apparatus as a whole. The rear carriage B, and with it the forward carriage D, are moved forward by admitting water under pressure into the cylinder $b^3$ by the pipe E through the hollow connecting-piece $b^4$ and the stationary hollow ram $b^2$, which is supported by the said connecting piece $b^4$ supported by one of the standards as shown. The forward carriage D, is under control independently of the rear carriage B, when required, by the two hydraulic rams and cylinders $D^3$ (Figs. 1 and 2) to which water under pressure can be admitted, when required, by the pipe $E^1$ jointed at $e^2$ to the bearer X and in communication with the pipe $E^4$ jointed at $e^3$ to the pipe $E^5$ jointed at $e^4$ to, and in communication with, the pipes $E^6$ which lead to the respective cylinders $D^3$. The two carriages B and D move forward a sufficient distance to cause the mandrel to pass through the hollow bloom, while its forward end is supported by a removable device W, (shown separately in Figs. 7 and 8) which acts as a stop, as well as a support. The said removable device is then moved out of position and the movements of the carriage B and D, are continued, as hereinafter explained, to cause the work to pass right through the rolls A so that it is operated upon thereby and brought into the form of a tube throughout its entire length.

The aforesaid combined support and stop W, for the forward end of the bloom may be made with a recess $w$, of U shape forming a support for the bloom and a raised part, or flange, $w^2$ shaped to form a stop for the bloom and allow the passage of the mandrel through the opening in it. The said support and stop can be moved up and down in side guides $w^3$, for example, by means of a hydraulic cylinder $w^4$ the ram $w^5$ of which is connected to the said support and stop W, by a link $w^6$, bell-crank lever $w^7$ and link $w^8$ as shown at $w^5$. The said cylinder $w^4$ is supplied with, and relieved from, water under pressure through the piping $E^7$.

The rear carriage B, carries a hollow shaft $B^2$, which supports the holder H of the mandrel G, which mandrel passes through the nose-piece $D^2$ of the forward carriage D, as seen in Fig. 3. The said hollow shaft $B^2$, slides longitudinally on the squared, or equivalently formed, part $j^2$ of the longitudinally stationary bar, or shaft $j, j^2$, the rear opening of the hollow shaft $B^2$ being squared at $j^3$ to fit the said part $j^2$. The said hollow shaft $B^2$ can be rotated in its mountings, or bearings, in the carriage B. Motions of intermittent partial rotation are given to the shafts $j$ $j^2$ and $B^2$, and consequently to the mandrel G, and the work upon it, by any suitable mechanism which is shown as being constructed as described and claimed in the specification of our application for patent Serial No. 131,353. A clutch is employed at K for putting the hinder part $j$ of the bar, or shaft, $j, j^2$ into connection with the forward part $j^2$ thereof, the parts being put out of engagement with each other in order to stop rotary movements of the mandrel and its holder while the bloom is being placed on the mandrel, or while the mandrel is being changed for another. The clutch K is shown as being operated by water under pressure admitted by one or other of the pipes $E^9$ into one or the other of the cylinders $k^2$ to move the one part of the clutch (through the clutch shifter $k^3$) into, and out of, engagement with the other part. The forward part $j^2$ of the bar or shaft $j$ $j^2$ when movements of partial rotation are imparted to it, will give corresponding movements to the hollow shaft $B^2$ in its bearings in the carriage B and consequently to the mandrel and work.

The mandrels are secured in place in the holder H, (which is secured in the end of the hollow shaft B² by any suitable means) in such a manner that, while they keep properly in place when in use, they can be connected and disconnected with great facility. To this end the hinder end of the mandrel is made with a flattened part, or wing pieces, g, which can, by the mandrel being moved backward in the holder H and then turned through a partial rotation, be caused to coincide with either the one, or the other, of the pairs or slots h and h², formed respectively between the projections h⁴ from the interior h⁵, of the said holder H and in the said projections. The slots h², are shorter than the slots h, so that only a small longitudinal movement of the mandrel will be necessary for engaging the flattened part or wing-pieces g, g, with, and disengaging them from the slots h² in securing and releasing the mandrel. When the mandrel is partially rotated in one direction the flattened part, or wing-pieces g, g, will coincide with the pair of slots h and when the said mandrel is partially rotated in the other direction the said flattened part, or wing-pieces, g, g, will coincide with the other pair of slots h². The slots h, pass right through from the front of the holder H, into the rear part of the interior thereof while the slots h², extend only a short way forwardly into the projections h⁴.

The flattened part, or wing-pieces, g, g, should join the mandrel by a reduced neck and, when the mandrels are to be used with a pilgering apparatus such as the present, the said flattened part, or wing-pieces, are not of greater breadth, over all, than the diameter of the mandrel so that the mandrel can be passed through the nose-piece of the pilgering apparatus as shown in Fig. 1, while, should the mandrel accidentally become loose and be drawn through the rolls, it will cause no injury.

When a mandrel is to be secured in place in the holder H, the rear end part of the said mandrel, with its flattened part, or wing-pieces g, g, coinciding with the pair of slots h, (Fig. 6ᴬ), is pushed into the said holder and when the wing-pieces g, g, get beyond the projections h⁴ (Fig. 5) the mandrel is partially rotated until the said wing-pieces g, g, are coincident with the pair of slots h², and then by the mandrel being drawn forward, or pressed forward in the holder by the spring h⁶, in the holder (Fig. 3), the wing-pieces g, g, engage with the slot h², and bear against the stops h³, formed by the ends of these slots, as shown in Fig. 6ᴮ, and the mandrel is retained in place in the holder H. The mandrel is removed from the holder by pushing the mandrel back, till the flattened part, or wing-pieces g, g, are beyond the rear ends of the projections h⁴, and then giving the mandrel a movement of partial rotation sufficient to cause the flattened part, or wing-pieces, g, g, to coincide with the slots h, and then the mandrel G, can be drawn out from the said holder longitudinally.

The stripping mechanism (shown separately in Figs. 9, 10 and 11) comprises carrying rollers o, supporting rollers p, and gripping rollers r, the rollers o, being mounted in bearings o², and the rollers p, being mounted in bearings p², carried in the frame P, mounted upon supports P², in which the frame P, can if desired be adjusted, by wedges p³, to suit work of different diameters.

The carrying and supporting rollers o, and p, are driven from the motor Q, through gear in the box q, which drives a shaft q², carrying a bevel pinion q³, which engages a bevel pinion q⁴, on a shaft q⁵, which carries other bevel pinions q⁶, which engage bevel pinions o³, and p⁴, on the shafts of the rollers o, and the shafts of the rollers p; the shafts of the rollers p carrying, at their other ends, pinions p⁵, which engage pinions r², on the shafts of the rollers r, the axes of which are carried by arms R, mounted so as to be capable of oscillatory movements on the shafts of the rollers p. The arms R are jointed at their upper ends to the side bars or links R² of a frame, to one end of which is connected a cable r³ which passes over pulleys r⁴ and carries a weight or weights R³. Under the pull of the latter, the rollers r are drawn into gripping engagement with the work which has been passed between the rollers p and r from the rollers o. The tube is thus stripped from the mandrel G. The arms R, of the forward pair of rollers r, (or any other convenient pair) have continuations r⁵, which are connected by the rod r⁶, with a slider s, which is moved by the hydraulic ram of the cylinder S (which is supplied with water under pressure by the pipe E⁸) to allow the tubes to pass between the rollers p and r and, when the water is cut off, allow the weight, or weights, R³, to act to grip the tubes between the rollers so that it is stripped from the mandrel.

The main driving shaft T, of the mill A, may, as shown in Figs. 1 and 2, be driven by either, or both, of the motors Q¹, Q², and rotary motion be transmitted therefrom to the crank-shafts a¹ and a² of the rolls A, respectively by toothed pinions t¹, secured to the shaft T, which toothed pinions engage with toothed wheels a³, secured to the crank-shaft a¹, the said toothed wheels a³, in turn engaging with the toothed wheels a⁴, secured to the crank-shaft a² to operate the rolls.

Rotary motion may be transmitted from the said driving shaft T, to a short shaft U, by means of a chain t², passing round chain-wheels t³ and u¹, secured to the shafts T and U, respectively, from which shaft U, rotary motion is transmitted to the shaft L and from thence to the pulley $i^3$ by bevel wheels $u^2$, and $l^3$ secured to the shafts U and L, respectively, so as to drive the mechanism which imparts movements of partial rotation to the work.

A weight, or weights, V, is, or are, suspended by a cord, or chain, $v$, passing over pulleys $v^1$, and attached to the forward carriage D, by means of guided rods $v^2$ the said weight acting to return the carriages B and D to their rearward positions upon the release of the pressure in their hydraulic cylinders.

The hereinbefore described apparatus can be operated in any suitable way, for example as follows:—The bloom is brought before the mandrel G, by any suitable tackle such as an overhead crane, the forward end of the bloom being supported upon the aforesaid support, or stop, W, which is elevated for the purpose. The rear and forward carriages B, and D, are then run forward so that the mandrel G, is passed into the perforation of the bloom and then the support and stop W, will be withdrawn and the bloom on the mandrel G, by further movement of the carriages, is carried into the rolls at A, and operated upon thereby, while at the intervals between the action of the rolls intermittent movements of partial rotation are given to the work by the mechanism provided for that purpose. It is presumed that there is, in this instance, some distance between the back of the forward carriage D, and the front of the rear carriage B. When the nose $D^2$, of the forward carriage D, comes to within a suitable distance of the rolls the forward movement of the said carriage D, is stopped and then the rear carriage B, is moved forward a distance which is allowed by the space between the two carriages and so the mandrel G, and the work on it, are moved forward while the forward carriage D, remains stationary and so the rolls then operate upon the small remaining portion of the bloom and therefore the whole bloom is converted into a tube without a thick end remaining. To facilitate the removal of the bloom from the mandrel, the rear carriage B, can be moved back while the forward carriage D, is kept stationary so that the rear end of the tube comes against the nose $D^2$ of the forward carriage D and the tube is loosened from the retreating mandrel. Or, if preferred, the rear and forward carriages can be close together during the first part of the passage of the work through the rolls, and when say about three quarters of the bloom has been acted upon by the rolls the forward movement of the rear carriage can be stopped and the forward carriage be moved forward so that the nose-piece thereof moves the work a sufficient distance along the mandrel and then the forward carriage is stopped and the rear carriage is moved forward to complete the passing of the bloom through the rolls.

It will be understood that the movements of intermittent rotation are given to the mandrel carrier at proper intervals betweeen the actions of the mill A, the clutch K being put in by the operator so that the turning gear is in action as required at the intervals between the action of the rolls. At the proper time the rollers $r$ of the stripper are raised and afterward lowered to grip the tube and remove it from the mandrel. The completed tubes can be delivered to any required place. When the water pressure in the cylinder $b^3$ and $D^3$, is released the weight V, runs back the carriage D, and this takes back also the rear carriage B, the formed tube being carried away by the stripper aforesaid and discharged from the machine.

We claim:—

1. In apparatus for use in making weldless tubes from hollow blooms, billets, and the like, a device for feeding the work to the rolls, the said device consisting of a carriage provided with a tubular shaft for the mandrel holder this shaft being capable of rotation in bearings in the said carriage; a longitudinally stationary bar, or shaft, upon which the tubular shaft can move longitudinally with the carriage, but not rotate independently of the said stationary bar, or shaft, and means for imparting to the said shafts movements of partial rotation at the requisite intervals and a stationary hollow ram upon which slides a hydraulic cylinder upon the said carriage; substantially as hereinbefore explained.

2. In apparatus for use in making weldless tubes from hollow blooms, billets, and the like, a device for feeding the work to the rolls, the said device consisting of two carriages, one being provided with a tubular shaft for the mandrel holder this shaft being capable of rotation in bearings in the said carriage, a longitudinally stationary bar, or shaft, upon which the tubular shaft can move longitudinally with the carriage, but not rotate independently of the said stationary bar, or shaft, and means for imparting, to the said shafts, movements of partial rotation at the requisite intervals and a stationary hollow ram upon which slides a hydraulic clinder upon the said carriage, the other carriage being movable independently of the first named carriage and being provided with a nose-piece through which the mandrel passes; substantially as hereinbefore explained.

3. In hydraulic apparatus for use in making weldless tubes from hollow blooms, billets, and the like, forming rolls, means for supporting and passing therethrough the metal to be operated upon, means for imparting movements of partial rotation to the work, together with a feeding arrangement comprising rear and forward carriages and means for rendering them capable of movement independently of each other to enable the rolls to act to form the tubes completely throughout the work; substantially as hereinbefore described.

In testimony whereof we have signed our names to this specification in the presence of two subscribing witnesses.

JOHN GEORGE INSHAW.
GEORGE RICHARD INSHAW.

Witnesses:
G. F. TYSON,
EDWD. GEO. DAVIES.